(12) United States Patent
Bunte et al.

(10) Patent No.: US 7,860,492 B2
(45) Date of Patent: Dec. 28, 2010

(54) METHOD AND DEVICE FOR INHIBITING INTERRUPTION OF A RUNNING APPLICATION BY AN EVENT

(75) Inventors: Bjorn Bunte, Unna (DE); Karsten Lehn, Kamen (DE); Peter Buth, Bochum (DE)

(73) Assignee: Nokia Corporation, Espoo (FI)

( * ) Notice: Subject to any disclaimer, the term of this patent is extended or adjusted under 35 U.S.C. 154(b) by 692 days.

(21) Appl. No.: 11/794,407

(22) PCT Filed: Jan. 31, 2005

(86) PCT No.: PCT/IB2005/000224

§ 371 (c)(1),
(2), (4) Date: Sep. 28, 2007

(87) PCT Pub. No.: WO2006/079867

PCT Pub. Date: Aug. 3, 2006

(65) Prior Publication Data

US 2008/0139190 A1 Jun. 12, 2008

(51) Int. Cl.
*H04M 3/00* (2006.01)

(52) U.S. Cl. ............... 455/418; 455/414.1; 455/550.1; 455/556.1

(58) Field of Classification Search ......... 455/418, 455/414.1, 556.1, 550.1
See application file for complete search history.

(56) References Cited

U.S. PATENT DOCUMENTS

| 2002/0094839 | A1* | 7/2002 | Otsuka .................. 455/556 |
| 2004/0121802 | A1 | 6/2004 | Kim et al. |
| 2005/0130631 | A1* | 6/2005 | Maguire et al. ........ 455/414.1 |

FOREIGN PATENT DOCUMENTS

| GB | 2396994 | 7/2004 |
| WO | WO 01/91424 | 11/2001 |

* cited by examiner

*Primary Examiner*—Danh C Le

(57) ABSTRACT

The present invention proposes a methodology implementable in form of a hardware or software module for inhibiting interruption of a running application by an event according to a selected non-disturbance profile, said event occurring on a mobile device.

26 Claims, 4 Drawing Sheets

METHOD AND DEVICE FOR INHIBITING INTERRUPTION OF A RUNNING APPLICATION BY AN EVENT

FIELD OF THE INVENTION

The present invention relates to methods for inhibiting interruption of a running application on a mobile device, wherein said event occurs while running said application. In particular, the present invention relates to a mobile device enabled to provide said methods in an efficient manner.

BACKGROUND

Today's mobile devices are developed to offer a user a wide spectrum of usability. A modern mobile device unifies almost all functions known from a usual personal computer and it has additionally the functionality of a mobile phone. They offer, among other things, the possibility to maintain and manage tasks or appointments, browse the internet, writing emails and even executing applications. Additionally, said devices may include useful tools like a video and a photo camera or an mp3 player, for instance.

Due to enhanced device capabilities of regular mobile handsets and new devices, specifically for gaming, the market for mobile gaming is growing rapidly. Mobile devices that are adapted to process complex applications like games for instance have become more powerful in the last years. Those mobile devices include color displays, large memory, as well as download and execution environments making game applications more fun and easier to access.

According to the state of the art, a mobile device interrupts or pauses a running application if an incoming call for instance occurs. This is done by a pop up message or similar and the user has to handle said pop up message for continuing using of said application. There is no possibility to set up a "do not disturb" behavior (or mode) within the running application which makes it possible to run said application without interruptions.

If a user receives for example a short message while running a game application, the operating system will interrupt said game and the user has to handle the pop up messages displayed on the screen for continuing the game. This behavior is undesirable for the user because of the unwanted distractions. Presently, if a user wants to play a game without disturbance, he has to switch off the communication interface of the device to avoid the above-mentioned behavior. However, the user does not want to switch off the communication interface because he needs the cellular engine to connect to game servers, for instance in order to play online multiplayer games. When watching or recording a video on a mobile phone or a mobile media player convergence device, the user does not want to be disturbed by events driven by the phone side of the device.

WO 2004/057888 discloses a mobile terminal that avoids a user to manually adjust the availability settings. However, said device is enabled to selectively set the availability based on a running application. One main disadvantage of the disclosed methodology is the necessary permanent connection to a network and additionally it cannot deal with application running alternatively in the foreground and in the background on the basis of the operating system.

SUMMARY

The overall object of the present invention is to improve the presently available behavior of a mobile device as an event is received while a certain application is running. Especially, it is an object of the present invention to ensure proper continuation of running applications, especially games, even in case of incoming events.

According to a first aspect of the present invention, a method for inhibiting interruption of a running application by an event is provided. Said inhibiting is provided according to a selected non-disturbance profile. Said event occurs on a mobile device, while said device is running a certain application. Modern mobile devices offer a lot of applications, whereby a user wants to be undisturbed by incoming calls or other events. In a first operation detecting of an occurrence of said event is provided. Afterwards, a determining if said non-disturbance profile has been set is provided. Then, inhibiting interruption of said running application according to said determined non-disturbance profile follows.

According to an embodiment of the present invention, said inhibiting is accompanied by a secondary indication without intermitting execution of said application if said non-disturbance profile is set. Thereby, a secondary indication to the user is provided, wherein said user realizes the occurrence of an event even if the application is not intermitted. The secondary indication may be in form of an audio notification for instance.

According to another embodiment of the present invention, a primary indication is provided if said non-disturbance profile is unset. Therewith a normal behavior of said device is reached.

According to another embodiment of the present invention, said non-disturbance profile is disabled if said application is run in the background on the basis of an operating system operating said mobile device. While the application is run in the background the mobile device will have a normal, standard behavior. Further, if the focus of the operating system is set back on the application, which corresponds to a foreground executing of said application, the non-disturbance mode is reactivated.

According to another embodiment of the present invention, said secondary indication is an audio, a vibrating or a visible indication provided by means of said mobile device. Thereby a user is notified about the occurrence of said event.

According to another embodiment of the present invention, said detected event is an external event. Thus it is possible to execute an application without being disturbed by an external event, like an incoming call for instance.

According to another embodiment of the present invention, said external event is an incoming short message (SMS), a multi media message (MMS), a Bluetooth-connection or a PoC-message.

According to another embodiment of the present invention, said detected event is an internal event. Thereby, internal events are handled in an efficient manner and a user may run said application without being disturbed.

According to another embodiment of the present invention, said internal event is a general system alert, a clock alert, a low energy indication, a reminding task or the like.

According to another embodiment of the present invention, said MMS is not fetched while said application is active and said non-disturbance profile is set. Because of the CPU performance increasing while fetching an MMS, it is preferred that said SMS is fetched later after quitting or pausing the foreground application.

According to another embodiment of the present invention, said profile settings define parameters for operating said mobile device. Thereby a general behavior controlling of said device is possible.

According to another embodiment of the present invention, said operational parameters provide an automatic activation of said non-disturbance profile on the basis of time information. Thus it is possible to activate said non-disturbance profile on a time basis. For instance while playing in the night hours or the like said modus is automatically set.

According to another embodiment of the present invention, said running application is a gaming application or a scanning application by means of a digital camera within said device. While using the camera device within said device it is preferred, that the scanning application is not intermitted by an incoming call for instance.

According to another embodiment of the present invention, said non-disturbance profile is set within said running application. While running an application like a gaming application for instance it is possible to set said non-disturbance profile by means of said application. This is advantageous because the user must not interrupt the running application to set said profile.

According to another embodiment of the present invention, said non-disturbance profile is set in the device settings. However, if a user has once set said non-disturbance profile, it will be activated only when said application is started and deactivated when said application is terminated or paused.

According to another embodiment of the present invention, said non-disturbance profile is passed through into the general profile settings of said mobile device. Thereby, the mobile device settings inherit said non-disturbance profile, so that said mobile profile may become a general profile setting if wanted.

According to another embodiment of the present invention, said non-disturbance profile is controlled by said general profile settings of said mobile device. It is possible to implement a non-disturbance profile within the general profile settings of said device. For instance, there may be implemented a general register for all applications within the device and a user is able to centrally control the non-disturbance functionality.

According to another embodiment of the present invention, said parameters of said non-disturbance profile that are used to determine said secondary indication are controlled by said mobile device for all applications. Thereby, the mobile device is able to control the behavior of all applications running on said device. Thus, a centralized supervision by said mobile device is reached.

According to another embodiment of the present invention, a user can define said parameters of said non-disturbance profile. In this manner a user is able to set his own non-disturbance profile settings.

According to another embodiment of the present invention, said parameters of said non-disturbance profile that are used to determine said secondary indication are controlled by said running application and only valid for said running application. For instance, if a user sets said non-disturbance profile within one certain application those settings are only valid for that defined running application. If said running application is moved into the background of the OS said secondary indication may be deactivated.

According to another embodiment of the present invention, said user can define said parameters of said non-disturbance profile for said application. Thereby a convenient user controlled behavior of said profile may be reached.

According to another aspect of the present invention, a computer program product is provided, which comprises program code sections stored on a machine-readable medium for carrying out the operations of the method according to any aforementioned embodiment of the invention, when the computer program product is run on a processor-based device, a computer, a terminal, a network device, a mobile terminal, or a mobile communication enabled terminal.

According to another aspect of the present invention, a computer program product is provided, said product comprising program code sections for carrying out the steps of anyone of the method according to any aforementioned embodiment of the invention, when said program is run on a processor-based device, a terminal device, a network device, a portable terminal, a consumer electronic device, or a mobile communication enabled terminal.

According to another aspect of the present invention, a software tool is provided. The software tool comprises program portions for carrying out the operations of the aforementioned methods when the software tool is implemented in a computer program and/or executed.

According to another aspect of the present invention, computer data representing instructions is provided which when executed by a processor causes the operations of the method according to an aforementioned embodiment of the invention to be carried out.

According to yet another aspect of the present invention a mobile device adapted for inhibiting interruption of a running application by an event according to a selected non-disturbance profile is provided. Said device comprises at least one component for detecting an occurrence of said event, one component for determining if said non-disturbance profile has been set and one component for inhibiting interruption of said running application according to said determined non-disturbance profile.

According to another embodiment of the present invention, said device further comprises a central processing unit (CPU) adapted for controlling said components. Thus a central controlling unit is provided which interconnects all the modules within said device.

According to another embodiment of the present invention, said device further comprises a memory unit and a data communication interface.

Advantages of the present invention will become apparent to the reader of the present invention when reading the detailed description referring to embodiments of the present invention, based on which the inventive concept is easily understandable.

BRIEF DESCRIPTION OF THE DRAWINGS

The accompanying drawings are included to provide a further understanding of the invention, and are incorporated in and constitute a part of this specification. The drawings illustrate embodiments of the present invention and together with the description serve to explain the principles of the invention. In the drawings.

DETAILED DESCRIPTION OF EMBODIMENTS OF THE INVENTION

It shall be noted that the designations portable device and mobile device are used synonymously throughout the description.

Reference will be made in detail to the embodiments of the invention examples, which are illustrated in the accompanying drawings. Wherever possible same reference numbers are used throughout the drawings and description to refer to similar or like parts. The following description relates to various embodiments based on which the skilled reader will understand the principle inventive concept of the present invention. Nevertheless, the skilled reader will appreciate that the inventive concept is likewise applicable to further embodiments, which are covered by the scope of the accompanying claims.

The following designations of abbreviations are used:
DDM Don't Disturb Mode (non-disturbance profile)
SW Software
SDK Software Development Kit
PoC Push to talk Over Cellular network
KLS Keep last settings (which means that the settings of the active profile shall be used)
MMS Multi Media Message
SMS Short Message Service
Vibra Vibration setting within the mobile device (phone)
API Application Interface
UI User Interface (e.g. Display).

Figure 1:
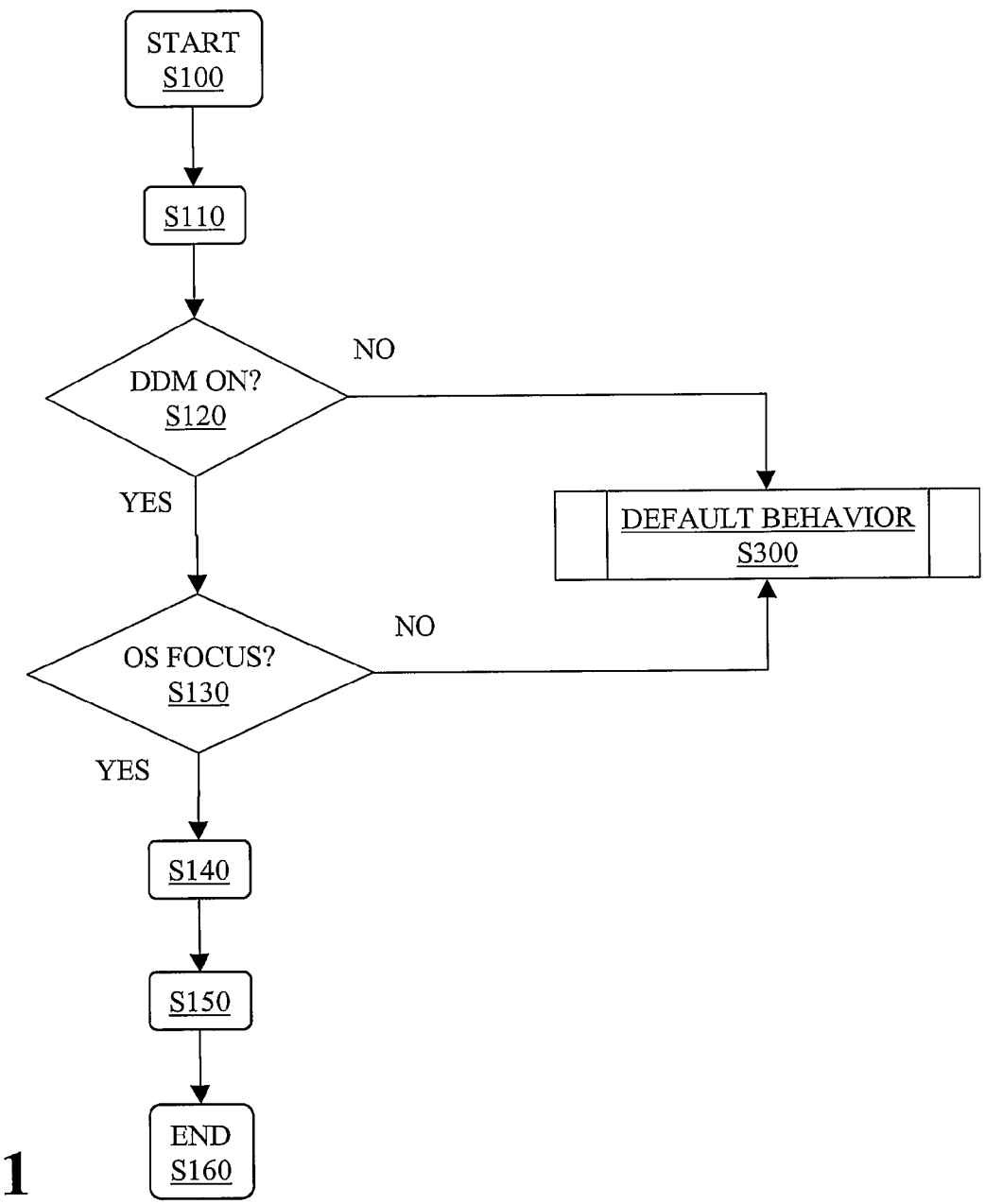
FIG. 1 is a flow chart illustrating a method for indicating an event in accordance with the present invention.

FIG. 1 is a flow chart representing as an operation sequence block diagram the methodology for indicating an event on a mobile device while running a certain application. Said method may be processed on a mobile device like a mobile phone, a PDA or the like.

In an operation S100, the operational sequence starts. In accordance with the aforementioned description of the inventive concept, a mobile device enabled to receive external events is provided. Said device is a mobile phone for instance which is equipped with an operating system (e.g. Symbian OS but not restricted thereto) and is additionally adapted to perform complex operations, for example in form of games.

While said user is playing a game an external event occurs in form of an incoming phone call or an incoming message (SMS). In an operation S110 the device is detecting the occurrence of said incoming call and has to manage this event. The state of the art methods are interrupting the application (game) and inform the user about said occurrence, which may be a disturbing or inconvenient behavior.

According to the present invention, an operation S120 is determining if said device has the possibility to be switched into a don't disturb mode (DDM). The operation S120 is represented as a conditional operation defining two branches, wherein the NO branch describes the default or standard behavior. This means that if the device has not enabled the DDM mode a standard operation S300 is performed, representing the default behavior of a mobile phone while an incoming event occurs as running a certain application. Thereby, the game is intermitted (paused) and the user will be informed about the occurrence of said external event. The user has now to deal with the messages displayed on the phone screen if he wants to continue playing the game, which may be inconvenient.

If the device has an enabled DDM mode, corresponding to the YES branch of the conditional operation S120, an operation S130 follows. The operation S130 is a conditional operation as well, and it will check if the operating system focus is applied on said application (game). With other words, the operation S130 checks if the game is run in the foreground or in the background based on the OS. This step is a key feature of a modern operating system like Symbian OS for instance. If the application is however in the background, according to the NO branch, said default operation S300 is provided, executing the above-mentioned steps for informing the user about the incoming call, or whatever.

If the conditional operation detects that the application is run in the foreground of the OS, which means that the OS is focused on said application, an operation S140 in accordance with the present invention follows. In operation S140 said application determines the game state and selects the indication used to inform the user. For example, the application could select said default operation when the application state is in a menu, but it could decide not to show a message on the display when the application is running with time critical user input, like a running game, a running video recording activity or the like. Operation S150 informs the user about said event according to the indication selected in operation S140. According to the present inventive step the phone may ring for instance but the game will be not interrupted and the user is now able to decide if he wants to respond or not. If the running application provides audio output like an MP3 player or a radio, a video or TV application, the phone or the portable device respectively may not ring but only vibrate and give an optical signal like a flashing background or keyboard illumination. Further, it is imaginable to inform the caller that the user has set the DDM mode on, for instance. It is also imaginable that the incoming events are accumulated in the background without noticing the user, so that after quitting or pausing the application the user is informed about the events by means of a list or the like.

Figure 2:
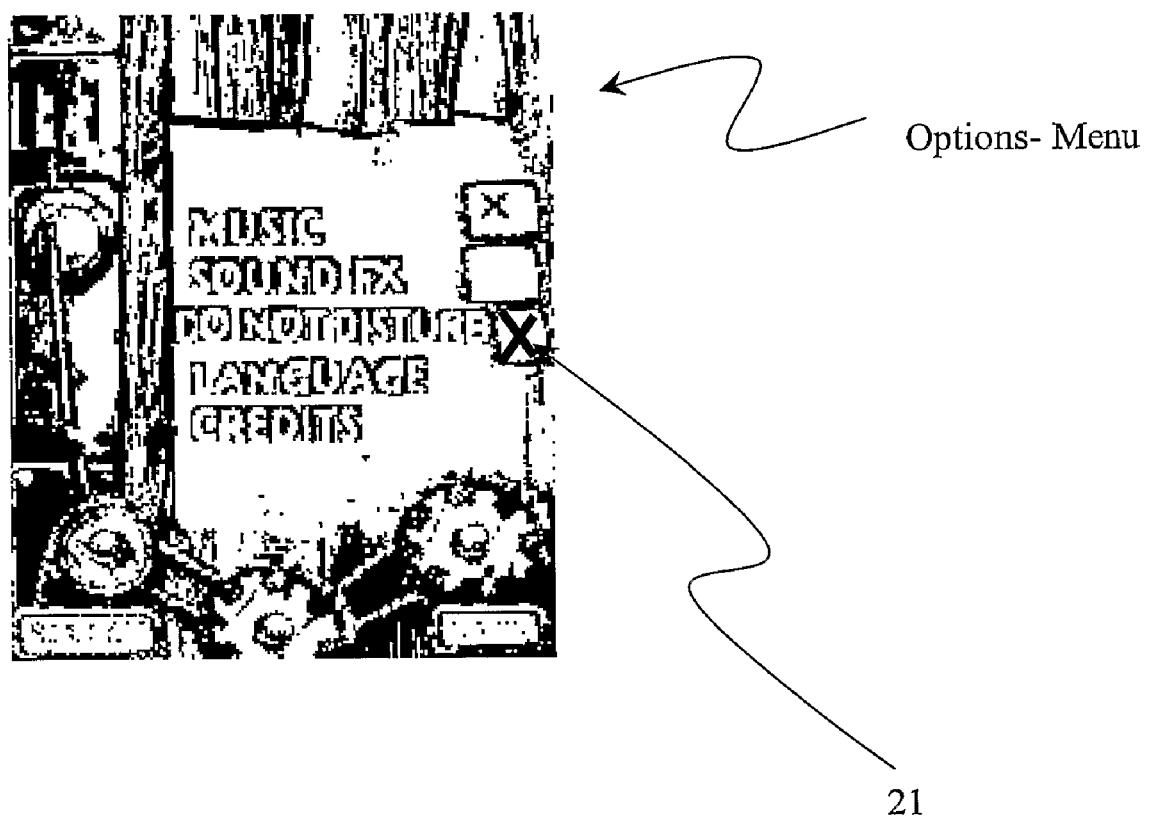
FIG. 2 depicts an options menu for setting the DDM mode in accordance with the present invention.

With reference to FIG. 2, a possible implementation in accordance with the present invention is depicted. FIG. 2 shows an options menu integrated in a certain application (game) which allows enabling of said DDM status or modus. The options menu is implemented as a graphical user interface (GUI) with a check button 21 adapted to switch on or off said DDM modus.

The mode can be activated/deactivated manually via the game menu or automatically when the user or the system (as in screensaver) puts another application to the foreground. Once, the DDM is deactivated (manually or automatically) the user will get the affected indications as in non-DDM, corresponding to the default behavior.

A list of possible actions which will deactivate the DDM, according to this example implementation is listed below: switching the game application to the background, ending the game, game crash, pausing the game. Other actions may be defined within the scope of the present invention.

The status of the DDM feature should be visible within the games option menu in the section where the user could enable/disable it, cf. FIG. 2 check button 21). The status is clearly highlighted via a symbol or via words like (ON/OFF).

The active device profile settings are valid even if the DDM was set to active, wherein said device settings are generally phone-related (mobile device-related) settings. The device profile settings correspond to those settings which define the standard behavior of said device. Some examples of active device settings are the ringing tone loudness or vibration strength signalizing an incoming call, for instance. These active device profile settings may sometimes interfere with the profile settings provided by means of the DDM mode. For instance, ringing tone rendering while running a game (or another API using sound), may be influenced by the sound settings within said API (game). Thus, a possible implementation of handling some above-mentioned conflicts is shown with reference to table 1.

Only for some special events the device will not behave accordingly to the active device profile settings. These exceptions are listed in the following table (table 1) and they describe a possible implementation as a non-restricting example. For instance, if the vibra-settings and the DDM are set, a system alert will not cause a vibra-procedure, according to a possible implementation in accordance with table 1. There is a lot of possible exception handling implementations within the scope of the present invention and table 1 just depicts an example.

TABLE 1

| Event | Game status | Vibra | Pop up menu | Game audio | Event indication audio |
|---|---|---|---|---|---|
| Incoming call indication phase | ACTIVE | KLS | OFF | OFF | KLS |
| Active call | PAUSED | KLS | ON | OFF | KLS |
| Alert (calendar & alarm clock) (for 3 sec) | ACTIVE | KLS | OFF | KLS | KLS |
| System alert | PAUSED | OFF | ON | OFF | ON |
| Incoming MMS | ACTIVE | OFF | OFF | KLS | OFF |
| Bluetooth message | ACTIVE | OFF | OFF | KLS | OFF |
| PoC message | ACTIVE | OFF | OFF | OFF | Voice message |

The contents of table 1 may be implemented as a list of settings in the DDM implementation of the device in a fixed way, or they can be configured by the application. In this way different applications could use different settings for the DDM. So, it may be favorable for an application in which optical information is prominent to have DDM settings that use acoustic indications in order not to interrupt the displayed optical information. An application in which audio information is prominent like an MP3 player or a radio, optical or vibrating indication of an event may be used in order not to interrupt the audio. In another embodiment the contents of table 1 may also be user configurable through a device menu and/or through an application menu. In the device menu the user could select those settings that are valid for all applications on the device, in the latter case the user could independently decide for each application which settings to use or override the device settings in case the application setting are in conflict with the device settings. If a conflict of device and application settings occurs, the application settings will be used, but only for this application.

Device settings will be stored in the device and will be applied to an application that uses the DDM mode according to the process described in FIG. 1. Device settings may for example be stored in or associated with the device profiles.

Application settings will be stored in the device with an indication to which application they are associated and will be applied only to the associated application according to the process described in FIG. 1.

Further, since an incoming MMS has high impact on the GPRS bandwidth and the processing power capabilities for the running game, the MMS must not be fetched while the DDM is active. According to the present invention the incoming MMS is just signalized to the user without downloading the message. This means that all available CPU performance is used for the present application (game) without any sacrifices.

Another process which may have a negative impact on the CPU performance is for example the receiving of a PoC message. Because this feature require an active GPRS connection while PoC messages are sent or received it will have a similar impact on the bandwidth and the processing power like fetching a MMS, which is already discussed above. Similar to MMS the whole CPU power will be used for the application run in the foreground, in accordance with the present invention.

Also an incoming GSM call could have an impact to the game performance (game experience) while the DDM is activated especially at the beginning/end of the call indication phase. Additionally, a server connection might be interrupted or slowed down if other applications use the cellular data transfer, however this could also result in a slow down of online game play.

Further, the audio routing behavior within the DDM will remain the same like in the non-DDM mode which means that the game audio will be muted during the event indication phase and in the active call mode. Once the event indication phase or active call mode is finalized the game audio will be switched on again with the previously set sound level.

Table 2 indicates the status of the DDM when the mode is active and the user switches to a different state within the game.

TABLE 2

| Game state | DDM status |
|---|---|
| Paused (manually and automatically) | ON |
| Game focus set to the background (another application becomes the foreground) | OFF |
| Multiplayer game session | OFF |
| Restart of the game (DDM set to ON during the last game play session) | ON |

This means, for instance, that the DDM mode will be switched off when a user will set a multiplayer game session. If the focus is set to the background on the basis of an OS operating said device the DDM mode is switched temporarily off as well. If said application is afterwards rerun in the foreground according to said OS, the DDM mode is switched on again, in accordance with the present invention.

In another embodiment of the present invention it is imaginable that settings concerning the DDM mode are first controlled by the operating system (OS) of said mobile device. In a next step if the OS detects that the application is running in the foreground of the OS system and additionally the DDM mode is set (enabled) the OS will handover the indication control to the running application. However, the application is now able to decide if the DDM mode settings may be applied or not. For instance, the DDM mode will be active just if the user is really playing the gaming application and not if said application is in another mode, like game options controlling or the like. Thereby only in an active mode the DDM mode may be enabled so that the user is able to play the game without any disturbance.

Further it is imaginable that single, certain parameters belonging to the DDM mode are individually modifiable or adjustable by a user of said portable device. The parameters may be modified even on device level or on application level. The device level settings are then valid for all applications which use the DDM mode. The application level settings are valid for said application and they may be controlled by an application menu, for instance.

Figure 3:
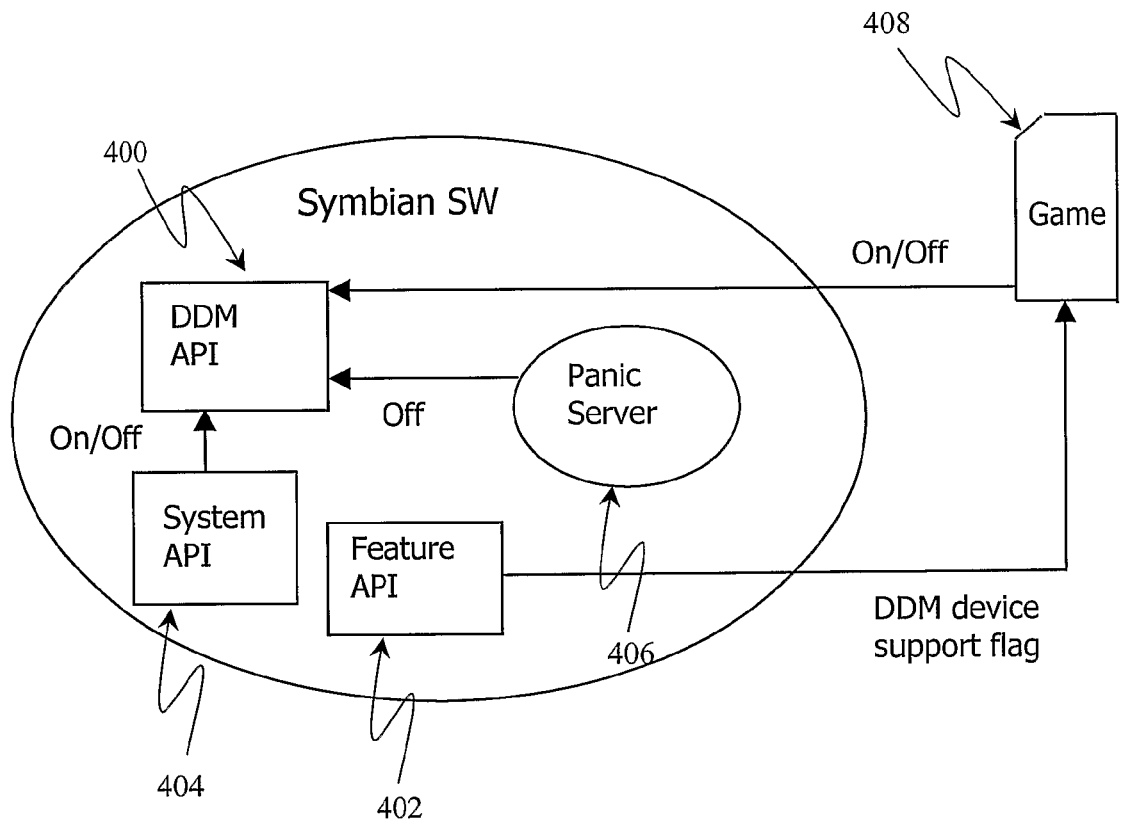
FIG. 3 depicts a possible implementation of the methodology according to the present invention.

With reference to FIG. 3 a possible software (SW) concept of the DDM mode in accordance with the present invention is depicted. FIG. 3 illustrates the basic SW concept for the DDM implementation which mainly bases on two API's, 400 and 402 and one server resided inside the core of the OS 406 (Symbian OS for instance).

The DDM-API 400 is enabled to provide a method to enable or disable the DDM mode, or generally said API 400 is controlling the DDM interface. The features-API 402 provides methods to verify the device capabilities of the mobile device including the DDM feature.

The game 408 requires this information to decide whether to enable the DDM options menu or not. This API 402 may not be exclusively used for the DDM setting; it may also be used for other API relevant features (not mentioned). A panic server 406 allows disabling the DDM once an unexpected device crash occurs or reset is executed.

The system application 404 is a key functionality based on the OS and it allows switching said application to the foreground or background and it handles therefore the activation or deactivation of the DDM if the system application will switch off the game.

Figure 4:
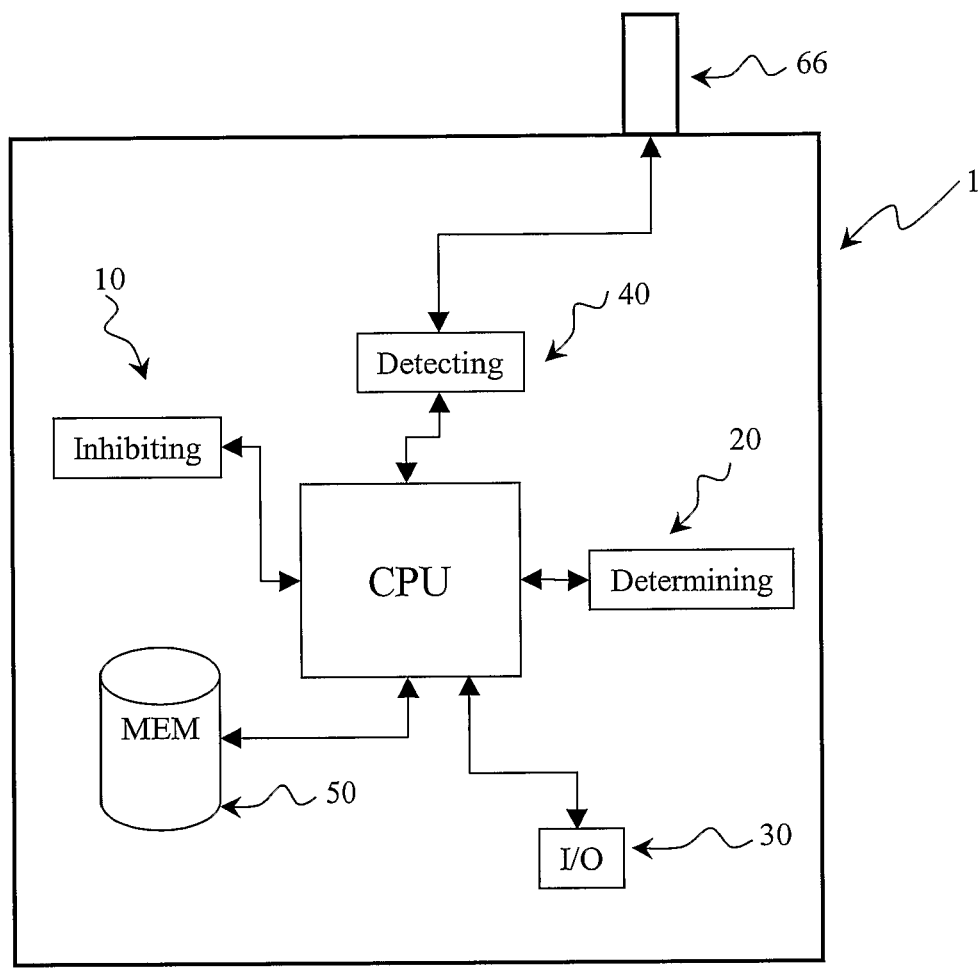
FIG. 4 shows a mobile device according to the present invention.

With reference to FIG. 4, a mobile device 1 in accordance with the present invention is depicted. Said mobile device may be a mobile phone adapted for execute games or other multimedia applications, also called game deck. The CPU controls all components within said mobile device 1. The component for detecting 40, determining 20 and inhibiting 10 in accordance with the present invention are connected to said CPU. Additionally the mobile device is equipped with a memory unit 50 adapted for storing different data and also with an I/O 30 module used by a user for inputting and receiving information.

The detecting component 40 may be implemented as transceiver which is able to receive incoming events by means of an antenna 66.

The following description in connection with the accompanying tables illustrates the behavior of a mobile device (game deck) mobile device in accordance with the present invention opposite to a state of the art device (right side of the chart). A number of use cases are listed in the following. There are a lot of imaginable implementations describing the behavior of said mobile device within the scope of the present invention.

Table 3 shows one possibility of the initial settings of the mobile device, running a gaming application. These settings are used as a basis for the possible use cases listed in the following tables 3 to 8. The left side of the tables represents the device behavior if the DDM mode is set in accordance with the present invention, while the right side depicts the state of the art functionality.

TABLE 3

| Phase | | DDM (ON) | | DDM (OFF) |
|---|---|---|---|---|
| Active game play | UI | Standard Game Window is displayed | UI | Standard Game Window is displayed |
| | Pop up | No | Pop up | No |
| | Game status | Active | Game status | Active |
| | Audio game | On | Audio game | On |
| | Event audio indication | Off | Event audio indication | Off |
| | Application focus | Game | Application focus | Game |
| | Comment | — | Comment | — |

The following table 4 explains the behavior of said mobile device while an incoming call is detected. In accordance with the inventive step of the present invention the gaming application is not inhibited by said incoming call.

TABLE 4

| Phase | | DDM (ON) | | DDM (OFF) |
|---|---|---|---|---|
| Incoming call Indication | UI | Standard Game Window is displayed | UI | Incoming Call is indicated |
| | Pop up | No | Pop up | Yes |
| | Game status | Active | Game status | Paused |
| | Audio game | Off | Audio game | Off |
| | Event audio indication | On | Event audio indication | On |
| | Application focus | Game | Application focus | Call application |
| | Comment | — | Comment | — |

A similar behavior is achieved when a MMS message is received, but according to the present invention the MMS will be later fetched, because of conserving the CPU performance for the active application

TABLE 5

| Phase | | DDM (ON) | | DDM (OFF) |
|---|---|---|---|---|
| Incoming MMS | UI | Standard Game Window is displayed | UI | Retrieving of MMS is indicated, and; After approx. 2 seconds the game pause menu will be displayed. |
| | Pop up | No | Pop up | Yes |
| | Game status | Active | Game status | Paused |
| | Audio game | On | Audio game | Off |
| | Alert audio indication | Off | Alert audio indication | On |
| | Application focus | Game | Application focus | Game (pause menu) |
| | Comment | As long as the DDM is active the MMS will not be fetched. | Comment | Just after the indication the MMS will be fetched |

Another possible use case is the receiving of an incoming PoC event which is depicted in accordance with table 6.

TABLE 6

| Phase | | DDM (ON) | | DDM (OFF) |
|---|---|---|---|---|
| Incoming PoC message | UI | Standard Game Window is displayed | UI | Incoming PoC is indicated |
| | Pop up | No | Pop up | Yes |
| | Game status | Active | Game status | Paused |
| | Audio game | Off | Audio game | Off |
| | Event audio indication | On | Event audio indication | On |
| | Application focus | Game | Application focus | Game (pause menu) |
| | Comment | The game audio will only be muted while the PoC message arrives, | Comment | The game will be paused just after the PoC message arrives. The user needs to resume the game afterwards. |

The mobile device behavior in accordance with the present invention is shown while a calendar/alarm clock alert occurs in accordance with the present invention (Table 7). As aforementioned, the right side describes the state of the art behavior of said mobile device.

Further, low battery warnings or general system alerts may be handled within the scope of the present invention.

TABLE 7

| Phase | | DDM (ON) | | DDM (OFF) |
|---|---|---|---|---|
| Incoming alert | UI | Standard Game Window is displayed | UI | Alert event is indicated, and; After pressing the 'Stop' or 'Snooze' button, the game pause menu will get the focus. |

TABLE 7-continued

| Phase | DDM (ON) | | DDM (OFF) | |
|---|---|---|---|---|
| | Pop up | No | Pop up | Yes |
| | Game status | Active | Game status | Paused |
| | Audio game | Off | Audio game | Off |
| | Event audio indication | On, for 3 seconds | Event audio indication | On |
| | Application focus | Game | Application focus | Calendar/Alarm clock application |
| | Comment | Game audio will be muted only for 3 seconds | Comment | — |

Table 8 describes receiving of a Bluetooth message from a PC, for instance and it shows as a non-restricting example in which manner said connecting request will be managed.

TABLE 8

| Phase | | DDM (ON) | | DDM (OFF) |
|---|---|---|---|---|
| Connection request from PC | UI | Standard Game Window is displayed | UI | Connecting menu is indicated |
| | Pop up | No | Pop up | Yes |
| | Game status | Active | Game status | Paused |
| | Audio game | On | Audio game | Off |
| | Event audio indication | Off | Event audio indication | On |
| | Application focus | Game | Application focus | System |

Even though the invention is described above with reference to embodiments according to the accompanying drawings, it is clear that the invention is not restricted thereto but it can be modified in several ways within the scope of the appended claims.

The invention claimed is:

1. A method comprising:
    detecting an occurrence of an event associated with a device;
    determining if a non-disturbance profile has been set;
    determining a conditional operation of an application running in the device and inhibiting interruption or allowing interruption of said running application depending on the conditional operation; and
    inhibiting interruption of said running application according to said determined non-disturbance profile by providing an acoustic secondary event indicator when interruption is inhibited and optical information is prominent in said application and providing an optical or vibrating secondary event indicator when interruption is inhibited and acoustic information is prominent in said application.

2. The method according to claim 1, wherein the secondary event indicators are provided without intermitting execution of said application if said non-disturbance profile is set.

3. The method according to claim 2, wherein parameters of said non-disturbance profile that are used to determine said secondary event indicators are controlled by said mobile device for all applications.

4. The method according to claim 3, wherein a user can define said parameters of said non-disturbance profile.

5. The method according to claim 2, wherein parameters of said non-disturbance profile that are used to determine said secondary indicators are controlled by said running application and only valid for said running application.

6. The method according to claim 1, wherein a primary indication is provided if said non-disturbance profile is unset.

7. The method according to claim 1, wherein the conditional operation of the running application is that the application is run in the background of an operating system of the device and said non-disturbance profile is disabled when said application is run in the background.

8. The method according to claim 1, wherein said detected event is an external event.

9. The method according to claim 8, wherein said external event is an incoming short message (SMS), a multi media message (MMS), a Bluetooth-connection or a PoC-message or the like.

10. The method according to claim 1, wherein said detected event is an internal event.

11. The method according to claim 10, wherein said internal event is a general system alert, a clock alert, a low energy indication, a reminding task or the like.

12. The method according to claim 1, wherein said MMS is not fetched while said application is active and said non-disturbance profile is set.

13. The method according to claim 1, wherein said profile settings define parameters for operating said mobile device.

14. The method according to claim 1, wherein said operational parameters provide an automatic activation of said non-disturbance profile on the basis of time information.

15. The method according to claim 1, wherein said running application is a gaming application or a scanning application by means of a digital camera within said device.

16. The method according to claim 1, wherein said non-disturbance profile is set within said running application.

17. The method according to claim 1, wherein said non-disturbance profile is activated when said application is started.

18. The method according to claim 1, wherein said non-disturbance profile is passed through to general profile settings of said mobile device.

19. The method according to claim 1, wherein said non-disturbance profile is controlled by said general profile settings of said mobile device.

20. The method according to claim 5, wherein the user can define said parameters of said non-disturbance profile for said application.

21. A computer program product, comprising a non-transitory computer readable storage medium having program code sections for carrying out the operations of claim 1, when said program code is run on a processor-based device, a terminal device, a network device, a portable terminal, a consumer electronic device, or a mobile communication enabled terminal.

22. A computer program product, comprising program code sections stored on a non-transitory machine-readable medium for carrying out the operations of claim 1, when said program product is run on a processor-based device, a terminal device, a network device, a portable terminal, a consumer electronic device, or a mobile communication enabled terminal.

23. A software tool, comprising program portions stored on a non-transitory computer readable storage medium having for carrying out the operations of claim 1, when said program is implemented in a computer program for being executed on a processor-based device, a terminal device, a network device, a portable terminal, a consumer electronic device, or a mobile communication enabled terminal.

24. An apparatus comprising:
   a first component for detecting an occurrence of an event associated with the apparatus;
   a second component for determining if a non-disturbance profile has been set;
   a third component for determining a conditional operation of the running application and inhibiting interruption or allowing interruption of said running application depending on the conditional operation; and
   a fourth component for inhibiting interruption of said running application according to said determined non-disturbance profile by providing an acoustic secondary event indicator when interruption is inhibited and optical information is prominent in said application and providing an optical or vibrating secondary event indicator when interruption is inhibited and acoustic information is prominent in said application.

25. The apparatus according to claim 24, further comprising a central processing unit (CPU) adapted for controlling said components.

26. The apparatus according to claim 24, further comprising a memory unit and a data communication interface.

* * * * *